N. A. CHRISTENSEN.
BRAKE MECHANISM FOR AUTOMOBILES AND SIMILAR VEHICLES.
APPLICATION FILED SEPT. 4, 1914.

1,291,765.

Patented Jan. 21, 1919.
3 SHEETS—SHEET 1.

Witnesses:
Fred Palm
Chas. L. Goss

Inventor:
Niels A. Christensen,
By Flanders, Bottum, Fawsett & Bottum
Attorneys.

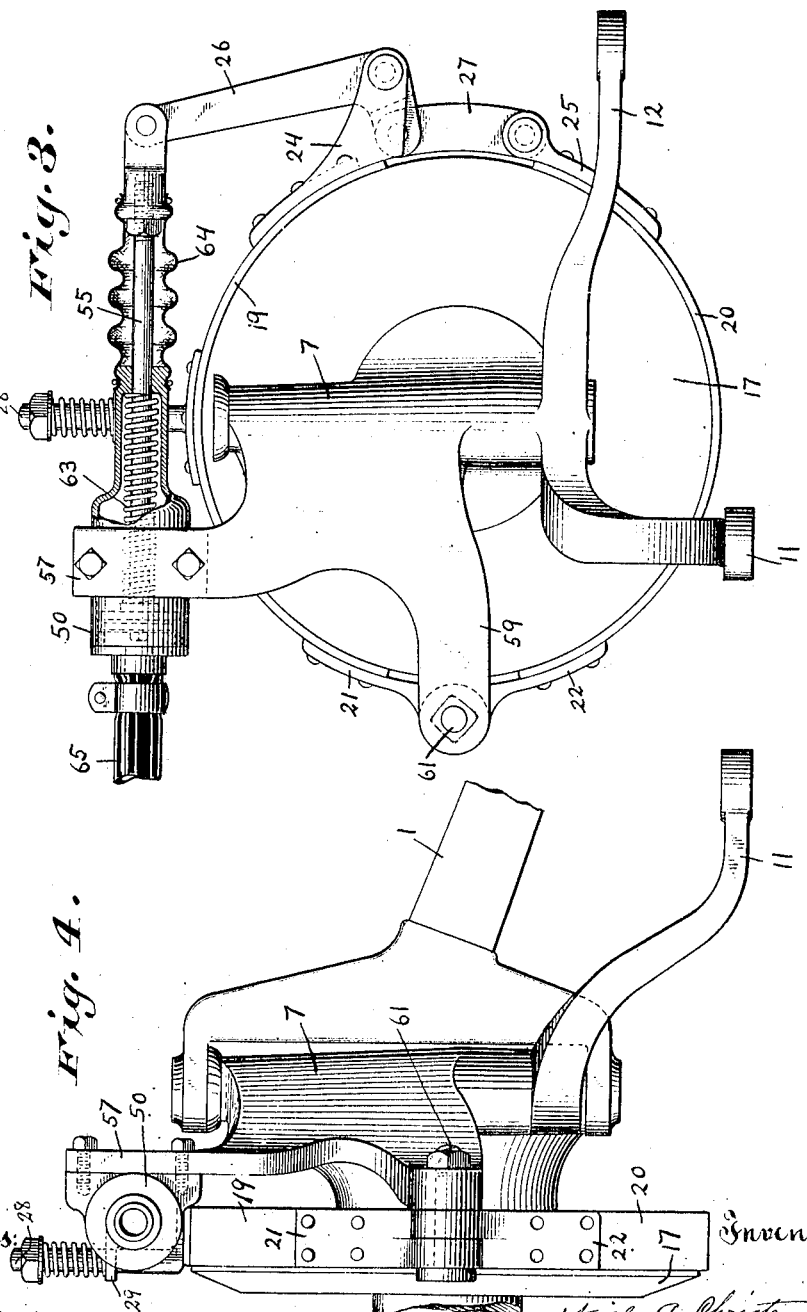

N. A. CHRISTENSEN.
BRAKE MECHANISM FOR AUTOMOBILES AND SIMILAR VEHICLES.
APPLICATION FILED SEPT. 4, 1914.

1,291,765.

Patented Jan. 21, 1919.
3 SHEETS—SHEET 3.

UNITED STATES PATENT OFFICE.

NIELS A. CHRISTENSEN, OF MILWAUKEE, WISCONSIN.

BRAKE MECHANISM FOR AUTOMOBILES AND SIMILAR VEHICLES.

1,291,765.  Specification of Letters Patent.  Patented Jan. 21, 1919.

Application filed September 4, 1914. Serial No. 860,125. REISSUED

To all whom it may concern:

Be it known that I, NIELS A. CHRISTENSEN, a citizen of the United States, residing at Milwaukee, in the county of Milwaukee and State of Wisconsin, have invented certain new and useful Improvements in Brake Mechanism for Automobiles and Similar Vehicles, of which the following is a specification, reference being had to the accompanying drawing, forming a part thereof.

This invention relates to brake mechanism for automobiles and similar vehicles and the objects of the invention are to improve brake mechanism for automobiles and similar vehicles in the manner to be hereinafter described and claimed.

Figure 1:
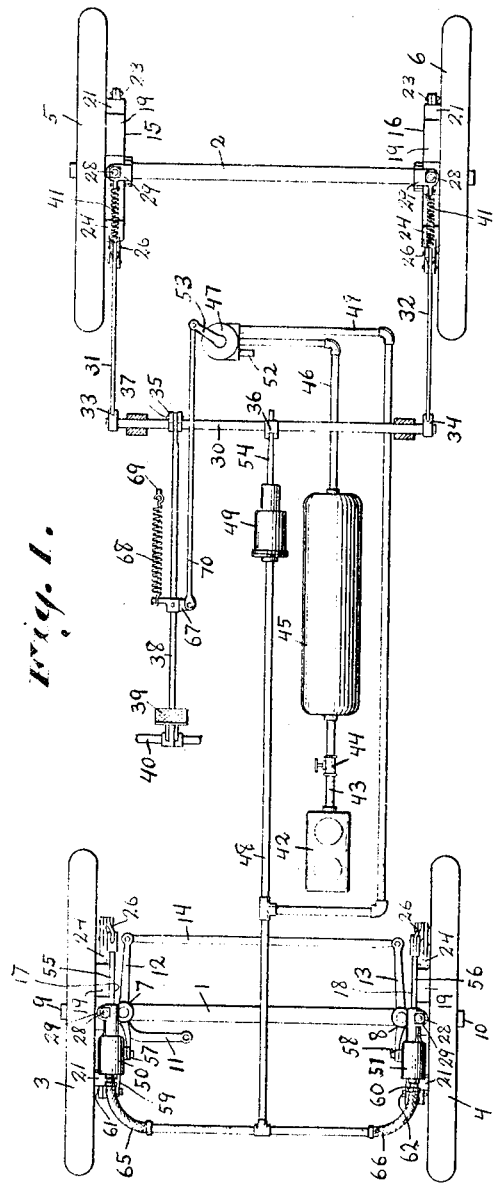
Figure 2:
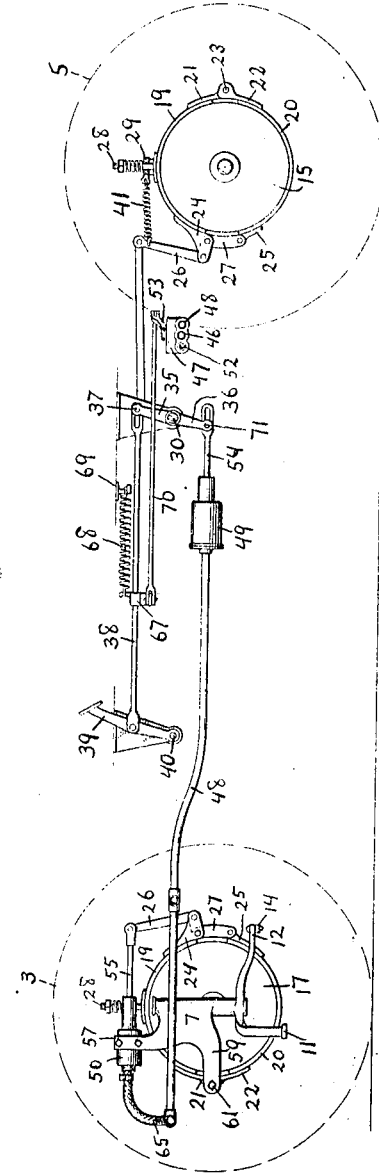
Figure 5:
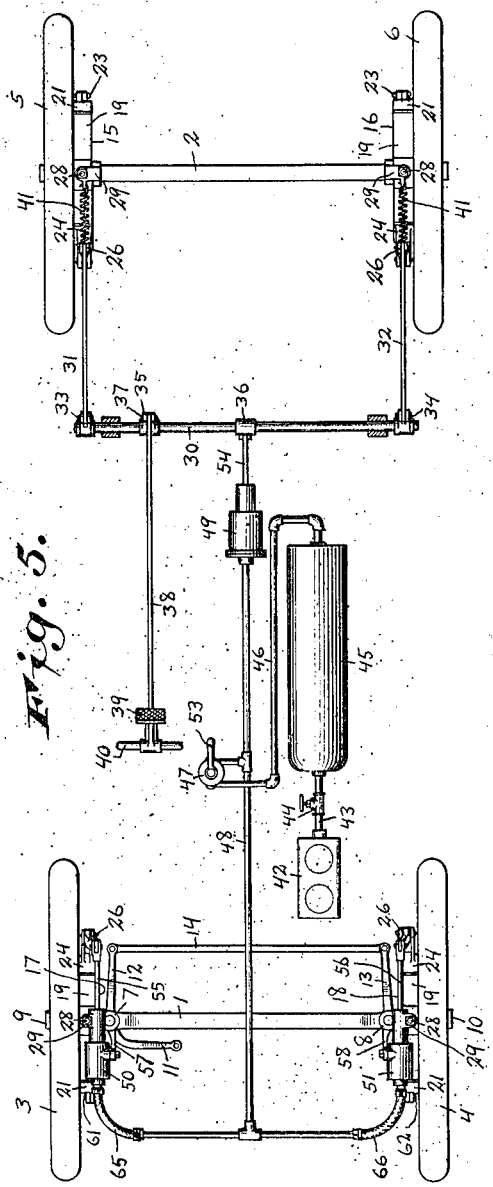
Figure 6:
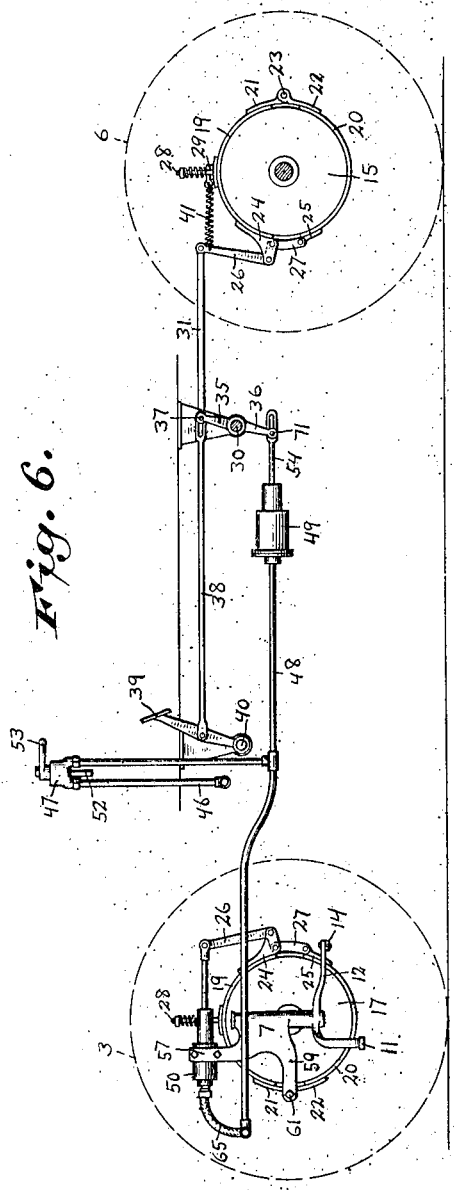

Referring to the drawings which accompany this specification and form a part hereof, which drawings illustrate embodiments of this invention, and on which drawings the same reference characters are used to designate the same parts wherever they may appear in each of the several views, Figure 1 is a plan view of parts of an automobile with the invention applied thereto; Fig. 2 is an elevation of parts of the mechanism illustrated by Fig. 1; Figs. 3 and 4 are elevations of details on an enlarged scale; Fig. 5 is a plan similar to Fig. 1 but illustrating a different arrangement of the brake mechanism; and Fig. 6 is an elevation of parts of the mechanism illustrated by Fig. 5.

The primary objects of the invention are to provide automobiles and similar vehicles with a fluid-pressure brake mechanism and for simplicity of illustration and description I have illustrated a form of air brake mechanism but by such illustration I do not intend to limit myself to compressed air as the braking fluid as the exhaust products of combustion of the engine can be employed or the difference in pressure required can be obtained by creating a partial vacuum, for example.

Preferably, the fluid-pressure brake mechanism is combined with mechanical braking mechanism in such a manner that the mechanical braking mechanism can be used independently of the fluid-pressure mechanism either as a matter of choice and convenience or in case the fluid-pressure mechanism should be out of service for any reason.

Referring to the drawings, the reference numeral 1 designates the front axle, 2 the rear axle, 3 and 4 the front wheels and 5 and 6 the rear wheels of an automobile or similar vehicle. The front axle is provided at each end with steering knuckles 7 and 8 which are provided with wheel spindles 9 and 10. One of the knuckles is provided with the crank 11 for connection with the steering gear (not shown) and the knuckles are connected to turn in unison by the link 14 secured to arms 12 and 13 projecting from the knuckles. Preferably all four wheels are provided with friction drums 15, 16, 17 and 18 or equivalent brake members adapted to be engaged by any suitable or preferred form of coacting brake members. The drawings illustrate an ordinary form of band brake composed of two sections 19 and 20 the ends of which are secured to lugs 21 and 22 which are hinged together by a pivot 23. The other ends of the said bands are secured to lugs 24 and 25. A bell crank lever 26 is pivoted to lug 24 and one arm of this lever is connected by the link 27 to the lug 25. An upstanding lug 28 is secured to the uppermost section 19, or strap or band, and is provided with a nut on its upper end which bears on a spiral spring which in turn is supported on some relatively fixed part 29 so that the upper band 19 will be lifted slightly from the friction drum when the brakes are not set. The band brakes for all four wheels are of the same construction and the corresponding parts are designated by the same reference numerals. The bell crank levers for the brake bands of the rear wheels are connected with the shaft 30 by the links 31 and 32 and the cranks 33 and 34. Cranks 35 and 36 are secured to shaft 30 and, preferably, the ends of these cranks are bifurcated to receive links. The brake pedal 39 is pivotally secured to the vehicle by pivot 40 and is connected with crank 35 by the link 38. The end of link 38 connected to the crank 35 is slotted and the pin 37 passes through the slot so that a certain amount of play or lost motion is provided for. The bell crank levers 26 for the rear wheels are provided with springs 41 to release the brakes in the ordinary manner.

The reference numeral 42 designates an air compressor of any suitable type which may be operated by the main engine of the vehicle or by means of a separate motor mechanism to supply fluid under pressure for operating the brakes. The compressor communicates by means of a pipe 43, provided with a cock 44, with a reservoir 45 from which the compressed air can be discharged into the brake cylinders 49, 50 and 51 through pipe 46, engineer's valve 47 and pipe 48. The cock 44 may provide for permitting a free discharge from the compressor to the atmosphere but is primarily intended simply as a blow off cock for the reservoir 45. The engineer's valve 47 may be of any preferred type and for simplicity I have illustrated a conventional form of three-way valve which places pipe 48 in communication with pipe 46 from reservoir 45 or with the exhaust 52 according to the position of the handle 53 of the valve 47.

The brake cylinders 49, 50 and 51 are of any preferred or ordinary type and are provided with plungers or pistons and piston rods 54, 55 and 56 which are of the same general form and adapted to operate in the same general way as the ordinary well-known forms of air brake apparatus. The brake cylinders 50 and 51 for the front wheels are so mounted as to turn with the wheels and are illustrated as secured to lugs 57 and 58 projecting from the steering knuckles 7 and 8. Preferably the steering knuckles 7 and 8 are provided with lugs 59 and 60 to which bolts or pins 61 and 62 secure the bands or sections of the band brakes for the front wheels. These pins 61 and 62 hinge the bands or sections together in the same way as the pins 23 of the brakes for the rear wheels do.

The piston rods 55 and 56 of the brake cylinders 50 and 51 are surrounded by spiral springs 63 which are adapted to be compressed between the pistons and the heads or ends of the brake cylinders during the operation of setting the brakes and their function is to restore the pistons to their normal positions to release the brakes when the air pressure is reduced. In the specific form of construction illustrated in connection with the front wheels, the springs 63 take the place of and have the same function as the springs 41 illustrated and described in connection with the brakes for the rear wheels.

The piston rods of the several brake cylinders may be surrounded by flexible rubber tubes or other means to prevent dirt lodging thereon as illustrated by Fig. 3 of the drawings and designated by the reference numeral 64.

The reference numerals 65 and 66 designate sections of flexible pipe, rubber hose for example, by which the pipe 48 is connected with the brake cylinders 50 and 51 to allow of movements as the wheels are turned to steer the vehicle or when the wheels move up or down with respect to the body of the vehicle, as it will be understood that the pipe 48 is secured to the body of the vehicle above the springs (not shown).

The drawings illustrate two schemes for applying the brakes by the fluid-pressure brake mechanism. Figs. 1 and 2 show the handle 53 of the engineer's valve 47 connected with the brake pedal 39 so that only the single, ordinary foot movement is required to set the brakes. With this arrangement the fluid-pressure brake mechanism will be operated each time the brakes are set by the foot pedal 39 and for reasons to be hereinafter described the brakes can be set by the foot pedal 39 if for any reason there is no supply of fluid under pressure for setting the brakes. Figs. 5 and 6 show the handle 53 of the engineer's valve 47 free from the brake pedal 39 for manual operation. With this construction the brakes may be set either by the foot pedal 39 or by the engineer's valve 47 as choice or necessity may determine. By using the foot pedal the power required to drive the compressor may be conserved in any known manner while at the same time, if the pressure on the foot pedal is not sufficient to hold the vehicle, the power of the fluid-pressure braking mechanism can be immediately applied.

Referring, now, to Figs. 1 and 2 of the drawings, the handle 53 of the engineer's valve 47 is shown as connected with the link 38 by the arm 67, which is secured to the link 38, and the link 70 which is pivotally secured to the handle 53 and to the arm 67. A spring 68 may be fastened to the body of the vehicle by a hook or bolt 69 to insure the handle 53 of the engineer's valve 47 being turned to the off or exhaust position when the brake pedal 39 is released.

The link 38 and the piston rod 54 of the brake cylinder 49 are provided with longitudinal slots to receive the pins 37 and 71 of the cranks 35 and 36. These slots should be long enough to allow for the full movement required of the cranks 35 and 36 in setting the brakes so that the brakes can be set either by the foot pedal 39 or by means of the engineer's valve 47. In the construction and arrangement illustrated by Figs. 1 and 2 the slot in the piston rod 54 forms a lost motion connection with the pin 71 in crank 36 so that as the foot pedal 39 is moved forward to apply the brakes and the handle 53 of the engineer's valve 47 is moved to let the compressed air into the brake cylinders the braking effect of the compressed air is applied immediately to the front wheels while the piston rod 54 is moving outward to take up the lost motion.

From the foregoing description the operation and use of the apparatus will be clearly understood. In both arrangements illustrated and described the brakes can be set by the foot pedal independently of the fluid-pressure brake mechanism, if there be no supply of fluid under pressure to operate the brake mechanism. In the construction and arrangement illustrated by Figs. 1 and 2 the engineer's valve is operated to set the brakes by the movement of the foot pedal and is operated to release the brakes by spring 68. In the construction and arrangement illustrated by Figs. 5 and 6 of the drawings the engineer's valve must be operated by hand either to set the brakes or to release them.

What is claimed is:

1. The combination with the front and rear wheels of automobiles and similar vehicles of brake members, fluid-pressure actuated mechanism for operating said brake members, and means for causing the brake members of the front wheels to be operated prior to the brake members of the rear wheels.

2. The combination with the wheels of automobiles and similar vehicles of brake members, mechanical means for operating said brake members, fluid-pressure actuated mechanism for operating said brake members, and a valve for controlling the action of the fluid-pressure actuated mechanism adapted to be moved by the mechanical means for operating the brake members.

3. The combination with the wheels of automobiles and similar vehicles of brake members, mechanical means for operating said brake members, fluid-pressure actuated mechanism for operating said brake members, a valve for controlling the action of the fluid-pressure actuated mechanism connected by a lost motion connection with the mechanical means for operating the brake members so as to be operated thereby in one direction, and means for restoring the valve to its original position.

4. The combination with the movable steering knuckle of an automobile or similar vehicle of a brake cylinder separately supported and rigidly connected with said steering knuckle and provided with a piston, a wheel mounted on said steering knuckle and provided with a brake member, and a brake member adapted to be actuated by said piston to contact with the brake member on the wheel.

5. The combination with the movable steering knuckle of an automobile or similar vehicle of a brake cylinder separately supported and rigidly connected with said steering knuckle and provided with a piston, a wheel mounted on said steering knuckle and provided with a brake member, brake bands pivotally supported by said steering knuckle, and a lever for actuating said brake bands by movement of the piston.

In witness whereof I hereto affix my signature in presence of two witnesses.

NIELS A. CHRISTENSEN.

Witnesses:
 CHAS. L. GOSS,
 J. R. CHAPMAN.